(No Model.)
J. SHEPPMAN.
TABLE CUTLERY.
No. 462,068. Patented Oct. 27, 1891.
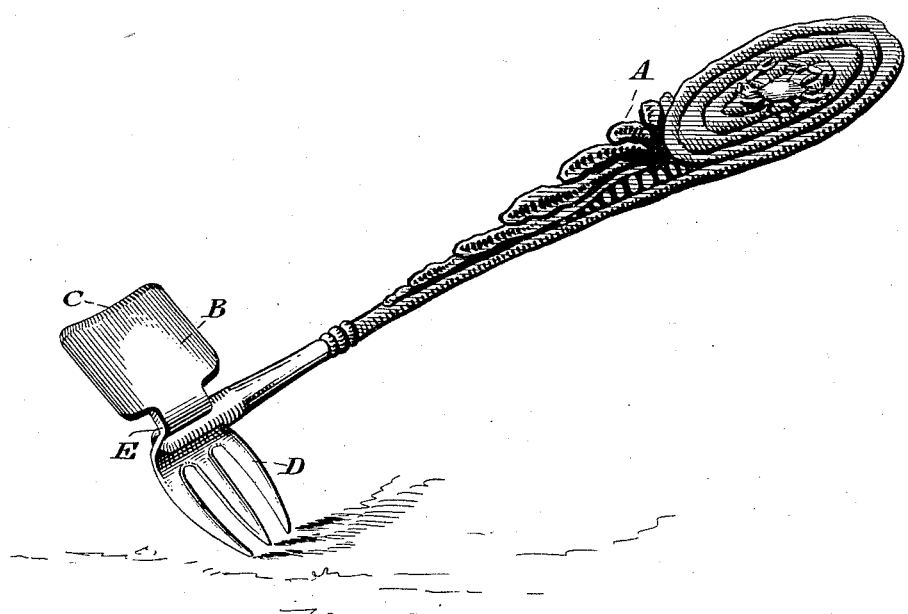
WITNESSES:
INVENTOR
John Sheppman
BY
ATTORNEY.

UNITED STATES PATENT OFFICE.

JOHN SHEPPMAN, OF PHILADELPHIA, PENNSYLVANIA.

TABLE-CUTLERY.

SPECIFICATION forming part of Letters Patent No. 462,068, dated October 27, 1891.

Application filed June 18, 1891. Serial No. 396,670. (No model.)

*To all whom it may concern:*

Be it known that I, JOHN SHEPPMAN, a citizen of the United States, residing in the city and county of Philadelphia, State of Pennsylvania, have invented a new and useful Improvement in a Combined Knife, Fork, and Spoon, which improvement is fully set forth in the following specification and accompanying drawing.

My invention relates to improvements in a combined knife, fork, and spoon; and it consists of a device formed of a handle having at one end and projecting therefrom in opposite directions a spoon and a fork, said spoon and fork being substantially at right angles to said handle, and said spoon having its forward edge sharpened, forming a knife.

It further consists of the combination of parts herein set forth.

In the drawing, which represents a perspective view of a device embodying my invention, A designates a handle provided at one end with the spoon B, which projects at substantially a right angle from the said handle, and has its front or forward end beveled or sharpened, so as to form a knife or cutting blade C. On the opposite side of the handle and at the same end as the spoon is a fork D, which also projects at substantially a right angle from said handle.

The device, by having the fork and spoon on opposite sides of the handle, is balanced, so that it is better adapted for use, and by having the knife at the forward end of the spoon the latter may be used with little or no liability of cutting the mouth.

It will be seen that the device is readily adapted for pie, which may be cut by the knife and either transferred to the mouth by the spoon or fork, as may be most convenient.

The neck E, connecting the fork and spoon, is curved, extending from opposite sides of the handle, thereby adding strength to the said parts, and the handle is forked, embracing said neck, and is soldered or otherwise secured thereto as a firm means of attachment.

I am aware that a combined knife, fork, and spoon is not new, and such I do not broadly claim; but the device constructed as herein described, wherein the fork and spoon are on opposite sides of the handle, balancing the same, and the knife-edge on the forward end of the spoon, is believed to be new.

Having thus described my invention, what I claim as new, and desire to secure by Letters Patent, is—

1. A combined knife, fork, and spoon consisting of a spoon and fork projecting in opposite directions, a connecting-neck intermediate of said parts, and a handle attached to said neck, the front end of the spoon forming a knife, said parts being combined substantially as described.

2. A combined knife, fork, and spoon having a spoon and a fork projecting from opposite sides of the handle thereof, said spoon having its front edge forming a knife, substantially as described.

JOHN SHEPPMAN.

Witnesses:
JOHN A. WIEDERSHEIM,
A. P. JENNINGS.